United States Patent [19]

Buckley

[11] 3,954,951

[45] May 4, 1976

[54] PREPARATION OF RED AMORPHOUS SELENIUM

[75] Inventor: David Alan Buckley, Rochester, N.Y.

[73] Assignee: Xerox Corporation, Stamford, Conn.

[22] Filed: Aug. 6, 1974

[21] Appl. No.: 495,242

[52] U.S. Cl. ............................................. 423/510
[51] Int. Cl.$^2$ ...................................... C01B 19/00
[58] Field of Search ..................... 423/510, 508; 260/607 R; 96/1.5

[56] References Cited
OTHER PUBLICATIONS

*Journal of the Chemical Society Abstracts of Papers,* (1902), Wynnd, W. P., editor, Gurney & Jackson, London; Vol. LXXXII, Pt. II, p. 652.
*Encyclopedia of Chemical Reactions,* Jacobson, C. A., editor, Chapman & Hall, London, Vol. V, p. 220, (1953).
*The Journal of Physical Chemistry,* Bancroft, W. D. et al., editor, "The Allotropic Forms of Selenium," Saunders, A. P., Vol. IV, pp. 428–429, 462–473, (1900).

*Zeitschrift fuer Anorganische Und Allgememeine Chemie,* Die Konstitution der Methanolischen und Aethanolischen Losgen," Simon, et al., Band 303, pp. 54–71, (1960).
*Zeitschrift fuer Chemie,* "Zur Existenz des Selensaure–diamides" Dostal, et al., Vol. 4, No. 9, p. 352, (1964).
*Zhumal Nanchnoi i prikiadnoi fotografii i Kinematografii,* Slutskin, et al., Vol. 16, No. 6, pp. 411–414, (1971) & Rough Draft Translation.
Morrison, et al., et al., *Organic Chemistry,* 2nd Edition, Allyn and Bacon, Boston, pp. 532–533, (1966).
*Zeitschrift fuer Anorganische und Allgemeine Chemie,* "Ein Beitrag Zur Chemie des Selentrioxydes", Rostal, et al., Band 296, pp. 28–35, (1958).

*Primary Examiner*—Oscar R. Vertiz
*Assistant Examiner*—Michael L. Lewis

[57] ABSTRACT

Red amorphous selenium is obtained by precipitating selenium from a solution of selenious acid in methanol or ethanol with hydrazine or a soluble salt thereof at a temperature between about −20°C. and the freezing point of the solution.

5 Claims, No Drawings

PREPARATION OF RED AMORPHOUS SELENIUM

This invention relates generally to a method for making red amorphous selenium and more particularly to a novel and improved method of reducing selenious acid to produce red amorphous selenium of small particle size.

It has been proposed before to precipitate selenium by reducing selenious acid in an aqueous solution with sulfur dioxide or sulfurous acid gas. Processes of this type are disclosed, for example, in British patent specification No. 515,676 and in U.S. Pat. Nos. 1,730,681; 2,186,085; and 3,130,012. In addition a process for precipitating selenium from an aqueous solution of selenious acid with sulfur dioxide, hydroxylamine hydrochloride or hydrazine sulfate at 6° to 45°C. is described in U.S. Pat. No. 2,860,954. These prior art processes have the disadvantage that the precipitate may be crystalline or if it is amorphous when formed it is unstable and soon becomes at least partially crystalline. Moreover, the precipitate is often a mixture of red and black selenium or it is in relatively large lumps or granules which are undesirable for some coating processes.

It is therefore an object of this invention to provide a process for making red amorphous metallic selenium which can be used to advantage for coating photoreceptors, rectifier cells and the like. Another object of the invention is to provide a process for making red amorphous selenium substantially free from black selenium and having a small particle size. A more specific object of the invention is to provide a novel process for precipitating red amorphous selenium from a solution of selenious acid in particles of not more than about 5 microns.

The foregoing objects and others are accomplished in accordance with this invention, generally speaking, by providing a process for precipitating stable red amorphous metallic selenium in particles of not more than about 5 microns wherein hydrazine is mixed with a solution containing selenious acid in methanol, ethanol or a mixture thereof at a temperature between about $-20°C$. and the freezing point of the solution and maintaining the temperature of the resulting suspension of metallic selenium between about $-13°$ and $-3°C$. until the yellow-orange amorphous precipitate formed by the reduction of the selenious acid changes to red amorphous selenium. The suspension may then be filtered and the precipitate washed with methanol or ethanol and dried. The product is substantially completely amorphous as shown by X-ray analysis and has a particle size of not more than about 5 microns. Particles as small as about 0.2 microns can be prepared by the process but it is preferred that they be within the range of about 1 to about 5 microns because it is sometimes difficult to filter a suspension of particles of less than 1 micron. It has been found that both the low precipitation temperature and alcohol solvent are required to produce an amorphous red product of small particle size which is stable in the sense that it remains amorphous substantially indefinitely.

Either methanol or ethanol may be used as the solvent for selenious acid but best results have been obtained so far with methanol so it is preferred. The solvent used to make the solution may be substantially anhydrous methanol or ethanol or it may contain up to about 50% by weight water with the remainder being methanol or ethanol. The precipitated red amorphous metallic selenium may be washed with methanol or ethanol or an aqueous solution within the foregoing concentration range.

The hydrazine may be added to the selenious acid solution in an aqueous solution thereof. It is preferred that the solution used for precipitation of metallic selenium contain from about 0.0001 percent to about 1 percent by weight selenious acid. The amount of hydrazine used should be at least stoichiometrically equivalent to the amount of selenious acid in the solution or an excess thereof.

In the following example, all parts are by weight unless otherwise specified:

EXAMPLE

About 25.8 grams selenious acid are dissolved in about 2.5 liters of substantially anhydrous methanol which has been previously cooled to about $-20°C$. About 10 grams of a 64% aqueous solution of hydrazine are added to the selenious acid solution while maintaining the temperature at about $-20°C$. A yellow-orange precipitate appears which upon warming to between $-13°$ and $-3°C$. turns to red. The suspension is stirred for about one hour, filtered with a sintered glass filter and the precipitate is washed with methanol and dried at room temperature. The product is about 12 grams of red amorphous metallic selenium having a particle size of about 1 to about 5 microns.

When the above example is repeated using water alone instead of aqueous methanol, the precipitate is a dark maroon to black color indicating that black selenium is obtained. If the example is repeated at $+20°C$. with methanol, the precipitate is also dark indicating the presence of black selenium.

The product provided by the invention may be used for the vacuum deposition of selenium on a metallic drum to make a photoreceptor for use in Xerography machines or for coating other electrical devices.

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. A process for producing stable red amorphous selenium in particles of less than about 5 microns which comprises precipitating selenious acid with hydrazine from a solution thereof in methanol or ethanol containing not more than about 50% by weight water at a temperature between about $-20°C$. and the freezing point of the solution and maintaining the resulting precipitate at a temperature of about $-13°$ to about $-3°C$. until it is red.

2. The process of claim 1 wherein the alcohol is methanol.

3. The process of claim 2 wherein the temperature of the solution is about $-20°C$. while the selenium is precipitated.

4. The process of claim 3 wherein the precipitate is washed with methanol or ethanol and dried.

5. The process of claim 1 wherein the alcohol is aqueous methanol.

* * * * *